T. E. MARSHALL.
HARROW DRAFT GEAR.
APPLICATION FILED MAR. 17, 1919.

1,435,075.

Patented Nov. 7, 1922.
3 SHEETS—SHEET 2.

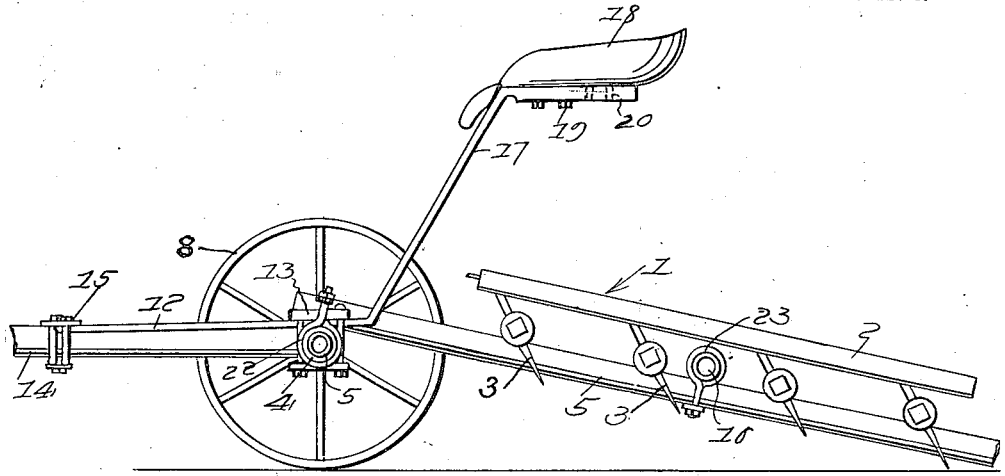

Patented Nov. 7, 1922.

1,435,075

UNITED STATES PATENT OFFICE.

THOMAS E. MARSHALL, OF MADELIA, MINNESOTA.

HARROW DRAFT GEAR.

Application filed March 17, 1919. Serial No. 283,217.

*To all whom it may concern:*

Be it known that THOMAS E. MARSHALL, a citizen of the United States of America, residing at Madelia, in the county of Watonwan and State of Minnesota, has invented new and useful Improvements in Harrow Draft Gears, of which the following is a specification.

The object of the invention is to provide a simple, unique and effective device for use in conjunction with the usual toothed harrow, whereby the latter may be employed in gangs for the effective cultivation of a comparatively large area of ground in one operation of moving the harrow over the ground. To this end the invention comprises a tubular axle member with detachable end extension, the axle member and extension being designed to have toothed harrows attached to them. An operator's or driver's seat is carried by the axle as well as a tongue and the necessary whiffle trees to permit the axle being hitched to draft animals and to permit the person operating the harrows to be carried by the apparatus. The extension sections are designed to be detached from the axle member and connected with it in such a way as to provide skids on which the harrows or harrow sections may be mounted, to permit the harrows or harrow sections to be carried from one field to another without performing any cultivating operation upon the ground. By this means the normal width of the apparatus as a whole is materially reduced so that it can be driven through gates and pass unobstructed along the usual width of roads.

As illustrated and described, a specific embodiment of the invention is adhered to, but to this embodiment is not to be restricted. The right is reserved to make such changes or alterations as the actual reduction to practice may suggest, in so far as such changes or alterations are compatible in spirit with the annexed claims.

The same numerals of reference designate the same parts through the several figures of drawings, wherein:

Figure 3 is a side elevational view of the draft gear per se, the wheel on the side facing the observer being removed.

Figure 4 is a detailed longitudinal sectional view showing the manner of attaching the extension sections to the main axle section.

Figure 5 is a detailed longitudinal sectional view through a portion of the tongue showing the latter as a receptacle for the cross rail used in connection with the skids when the said cross rail is so used.

Figure 1:
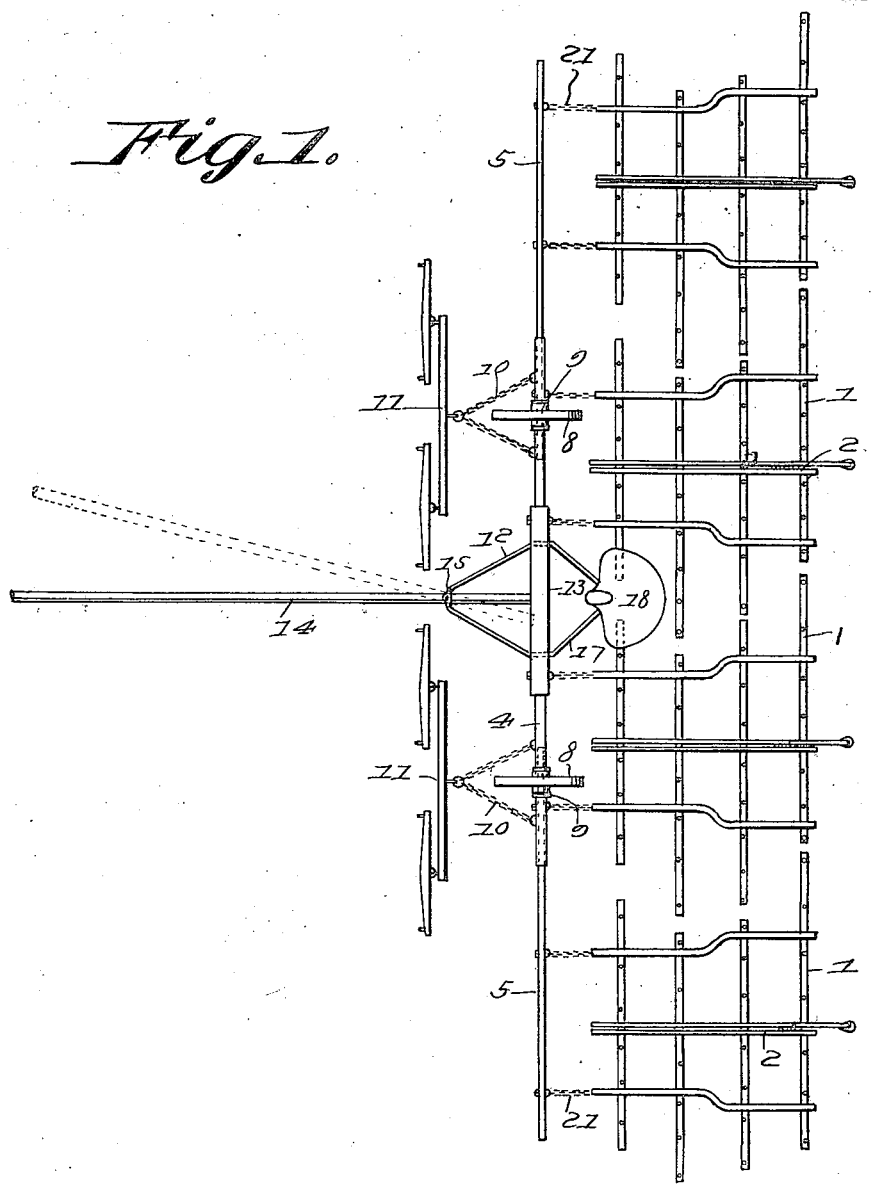
Figure 1 is a top plan view of the invention.
Figure 2:
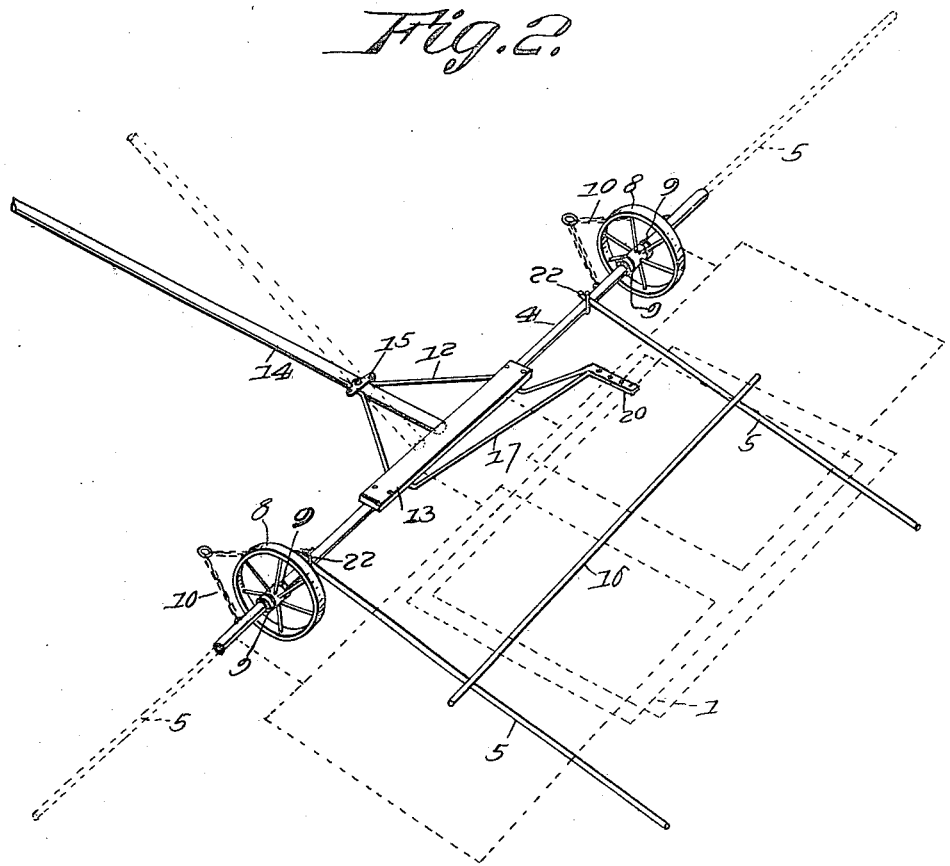
Figure 2 is a perspective view of the draft gear per se, showing the extension sections of the axle member being used as skids. This figure illustrates in dotted lines the normal position of the axle sections and illustrates also how the harrow sections are carried for transportation from one place to the other.

Referring to the drawings, the invention is shown as a draft gear for a plurality of toothed harrows 1 of the conventional style and provided with the conventional means 2 by which the inclination of the teeth 3 of the harrows may be changed. The draft gear itself comprises an axle section 4 of tubular construction and adapted to receive in its opposite ends the extension sections 5, the latter being adjustable to vary the length of the main axle and thereby increase the width of the draft gear as a whole so as to accommodate the desired number of harrows 1, or to adjust the apparatus for different widths of harrows. The extension sections 5 are secured in an adjusted position by set screws 6 threaded through the main axle and bearing upon the extension sections. When the screws 6 are set the extension sections are obviously held rigid but when the said screws are loosened the said sections may be adjusted in or out of the main axle section 4.

The axle section 4 carries adjacent each end a ground wheel 8, these two wheels being rotatably mounted upon the axle and secured in place thereon between collars 9 which are adjustable along the axle to position the wheels nearer to or farther away from the ends of the axle 4 as desired. Chains 10 connect with the axle 4 on each side of the wheels 8 and each pair of these chains connects with a whiffle tree 11, to permit the draft gear being hitched to draft animals.

Mounted upon the axle section 4 at an intermediate point in the length of the latter there is an open frame 12, this frame carrying a narrow but relatively long platform 13 and further carrying the tongue 14 which is pivotally connected to the frame as indicated at 15, the rear end of the tongue extending close to the axle 4 to project underneath the platform 13 against which this rear end of the tongue abuts to aid in supporting the outer end of the tongue. The provision of pivotal means for mounting the tongues makes for the easy turning of the apparatus by permitting the tongue to swing laterally to one side or the other.

The tongue 14 is of tubular shape and when the draft gear is in use this tongue carries a tubular member 16 the purpose of which appears hereinafter.

The rear end of the open frame 12 is extended upwardly to provide a seat supporting section 17 on which there is carried a seat 18 secured to this seat supporting section by the bolts 19, the seat supporting section 17 being provided with a plurality of holes 20 through any adjacent two of which the bolts 19 may be passed to position the seat forwardly or rearwardly on the seat-supporting section 17, obviously to provide for the weight of the operator counterbalancing the weight of the tongue. The lighter the operator the farther back on the seat supporting section is the seat placed.

In the use of the improved draft gear, the extension sections 5 are attached in the ends of the main axle, as shown in Figure 1, and the harrows or harrow sections 1 are connected with the main axle and with the extension sections by chains as indicated at 21. The draft animals are hitched to the whiffle trees 11, and the weight of the forward end of the tongue is counterbalanced by the weight of the operator sitting upon the seat 18. The apparatus may thus be driven over the ground to be cultivated and undue weight is kept off of the draft animals by the counterbalancing feature provided by the seat. When it becomes necessary to turn the whole apparatus the tongue swings readily to one side or the other in the direction to which the turn is made, and the whiffle trees being connected with the axle, as they are, are kept free of engagement with any part of the apparatus when the turn is being made.

In the event that it is desired to transport the apparatus to a new field and to prevent the operation of the harrows during such transportation, the whole apparatus is materially condensed in size. The extension sections 5 are detached from the axle sections 4, and are connected to the axle section 4 so as to perform the function of the skids, one end of each extension section being clamped to the axle section as indicated at 22. The tubular member 16 is withdrawn from the tongue 14 and mounted transversely across these skids to which it is secured by the clamping members 23. The center harrow sections 1 are then placed on the skids on top of this transverse tubular member 16 and the outermost sections which were previously drawn by the extension sections 5 are superimposed on top of the center sections when the apparatus is condensed to a width not exceeding the length of the main axle section 4. The apparatus is then ready for transportation to a new field of operation and the harrow teeth are held out of engagement with the ground during such transportation.

The invention having been described, what is claimed as new and useful is:

1. In an apparatus of the kind set forth, the combination with a plurality of harrow sections, of a main tubular axle, a combined seat and pole support disposed on said main axle at an intermediate point, wheels mounted on said main axle, and extension axle sections detachably engaged with the extremities of the main axle, the harrow sections being attached respectively to the main axle and to the extension sections.

2. In an apparatus of the kind set forth, the combination with a plurality of harrow sections, of a main tubular axle, a combined seat and pole support disposed on said main axle at an intermediate point, wheels mounted on the main axle and adjustable longitudinally of the latter, and extension axle sections detachably engaged with the extremities of the main axle, the harrow sections being attached respectively to the main axle and to the extension sections.

In testimony whereof he affixes his signature.

THOMAS E. MARSHALL.